United States Patent [19]

Hettrick

[11] Patent Number: 5,274,435
[45] Date of Patent: Dec. 28, 1993

[54] GRATING MONOCHROMATORS AND SPECTROMETERS BASED ON SURFACE NORMAL ROTATION

[76] Inventor: Michael C. Hettrick, P.O. Box 8046, Kensington, Calif. 94707

[21] Appl. No.: 841,421

[22] Filed: Feb. 26, 1992

[51] Int. Cl.$^5$ ............................................. G01J 3/18
[52] U.S. Cl. ................................. 356/328; 356/334; 378/84; 378/85
[58] Field of Search ............... 356/308, 309, 319, 326, 356/328, 331–; 359/15, 17, 18, 566–; 378/84, 85

[56] References Cited

U.S. PATENT DOCUMENTS

| | | | |
|---|---|---|---|
| 734,133 | 7/1903 | Porter | 359/567 |
| 3,211,049 | 10/1965 | McPherson | |
| 3,495,909 | 2/1970 | Axelrod | |
| 3,721,487 | 3/1973 | Pieuchard | |
| 3,973,850 | 8/1976 | Pouey | |
| 4,027,975 | 5/1977 | Turner | |
| 4,036,558 | 7/1977 | Pouey | |
| 4,241,999 | 12/1980 | Pouey | 356/331 |
| 4,254,335 | 3/1981 | Tondello | 250/277 |

(List continued on next page.)

OTHER PUBLICATIONS

H. A. Rowland, "On concave gratings for optical purposes," Phil. Mag. vol. 16, 1883, pp. 197-210.
M. Seya, Sci. Light, vol. 2, 1952, p. 8.
T. Namioka, "Theory of the concave grating III. Seya-Namioka Monochromator," J. Opt. Soc. Am. vol. 49, 1959, p. 951.
R. J. Fonck et al, "Multichannel grazing incidence spectrometer for plasma impurity diagnosis: SPRED," Appl. Opt. vol. 21, 1982, p. 2115.
T. Kita et al, "Mechanically ruled aberration-corrected concave gratings for a flat field grazing incidence spectrograph," Appl. Opt. vol. 22, 1983, p. 512.
W. R. Hunter et al, "Higher-order suppression in an on-blaze plane-grating monochromator," Appl. Opt. vol. 23, 1984, p. 293.
W. Werner et al, "X-ray monochromator designs based on extreme off-plane grating mountings," Appl. Opt. vol. 20, 1981, p. 487.
D. Maystre et al, "Spectrometer with constant efficiency," in Topics in Current Physics vol. 22, R. Petit, Ed. (Springer, Berlin, 1980).
D. Vincent et al, "X-ray gratings: the GMS mount," Appl. Opt. vol. 18, 1979, p. 1780.
M. Neviere et al, "On the use of classical and conical diffraction mountings for xuv gratings," J. Opt. Soc. Am. vol. 68, 1978, p. 1106.
D. Maystre et al, "Geometrical invariance property of gratings," Appl. Opt. vol. 24, 1985, p. 215.
M. Itou et al, "Soft x-ray monochromator with a varied-space plane grating for synchrotron radiation," Appl. Opt. vol. 28, 1989, p. 146.
R. P. Madden et al, J. Opt. Soc. Am. vol. 62, 1972, p. 722.

(List continued on next page.)

Primary Examiner—F. L. Evans

[57] ABSTRACT

An optical system and method comprising a diffraction grating which rotates about its surface normal to change the magnitude of the wavelength diffracted to an image location. At grazing incidence, such a rotation is determined to maintain the diffracted image in focus over a wide range in scanned wavelength. Monochromator and spectrometer embodiments include plane and curved surface gratings with both classical and varied-spaced groove patterns, and a variety of illumination geometries. In the simplest case, a grazing incidence monochromator is constructed in which a self-focusing classical spherical grating scans the value in wavelength which is transmitted between fixed slits located on the Rowland circle of the grating. The diffracted image remains in perfect focus over two octaves in wavelength at high efficiency, with both entrance and exit slits fixed in position, and the radiation aperture is constant.

57 Claims, 8 Drawing Sheets

5,274,435

Page 2

U.S. PATENT DOCUMENTS

| | | |
|---|---|---|
| 4,312,569 | 1/1982 | Harada. |
| 4,398,823 | 8/1983 | Brown .................................. 356/334 |
| 4,462,689 | 7/1984 | Kabler .................................. 356/333 |
| 4,492,466 | 1/1985 | Aspnes .................................. 356/334 |
| 4,528,488 | 7/1985 | Doggett .................................. 359/18 |
| 4,553,253 | 11/1985 | Petersen .................................. 378/84 |
| 4,605,306 | 8/1986 | Kaffka .................................. 356/334 |
| 4,613,233 | 9/1986 | Wilson .................................. 356/328 |
| 4,776,696 | 10/1988 | Hettrick .................................. 356/328 |
| 4,991,934 | 2/1991 | Hettrick .................................. 350/162 |
| 5,046,794 | 9/1991 | Ritter et al. .................................. 359/18 |

OTHER PUBLICATIONS

M. C. Hettrick et al, "Stigmatic high throughput monochromator for soft x-rays," Appl. Opt. vol. 25, 1986, pp. 4228–4231.

G. Monk, "A mounting for the plane grating," J. Opt. Soc. Am. vol. 17, 1928, pp. 358–364.

M. Salle et al, Compt. Rend. vol. 230, 1950, p. 380.

R. Onaka, Sci. Light vol. 7, 1958, p. 23.

M. C. Hettrick, "High resolution gratings for the soft x-ray," Nucl. Instrum. Meth. vol. A266, 1988, p. 404.

W. C. Cash Jr., "X-ray spectrographs using radial groove gratings," Appl. Opt. vol. 22, 1983, p. 3971.

E. Ishiguro, "Constant deviation monochromator for the range 100 Å$<\lambda<$1000 Å," Rev. Sci. Inst. vol. 60, 1989, p. 2105.

H. Dietrich, "A grazing incidence vacuum ultraviolet monochromator with fixed exit slit," Rev. Sci. Instr. vol. 43, 1972, p. 434.

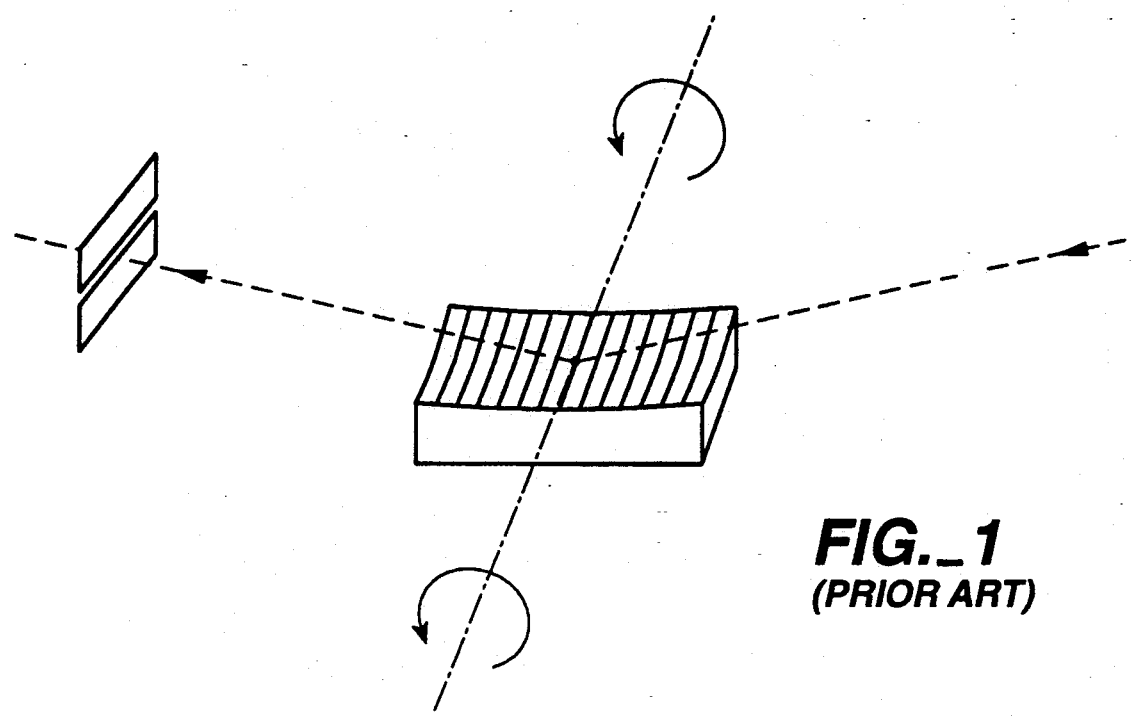
FIG._1
*(PRIOR ART)*
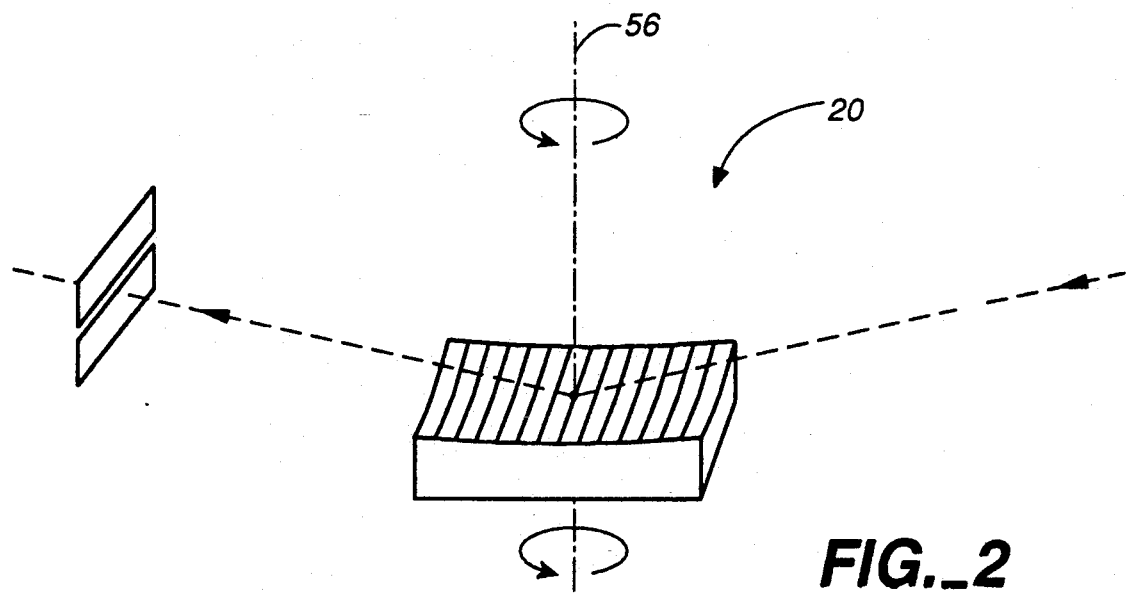
FIG._2

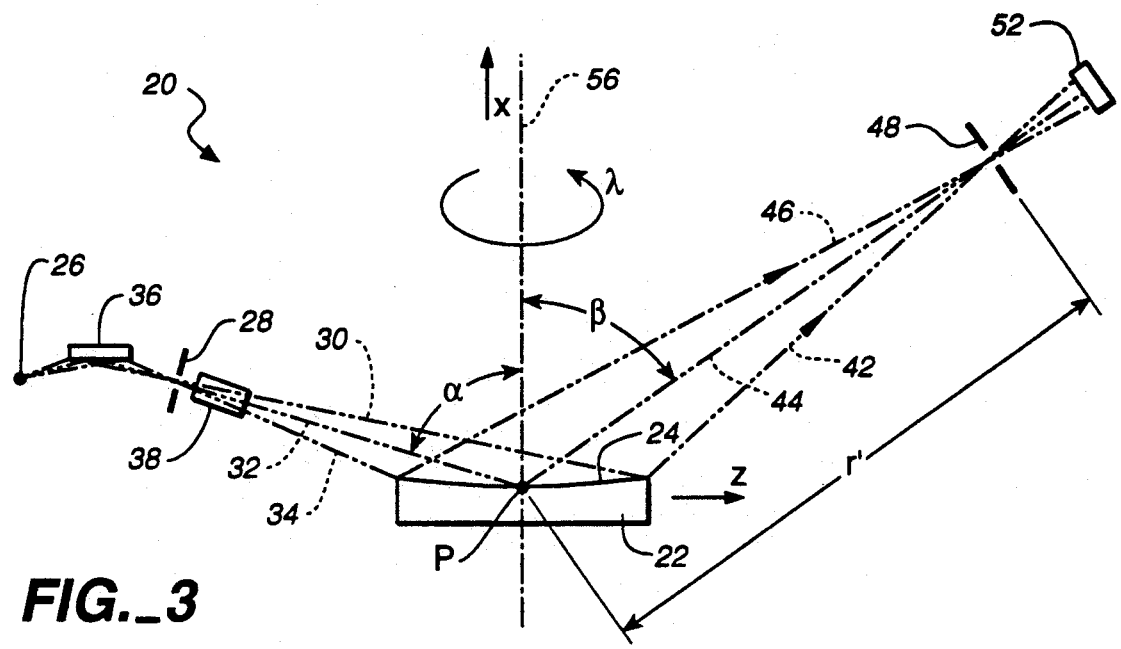
FIG._3
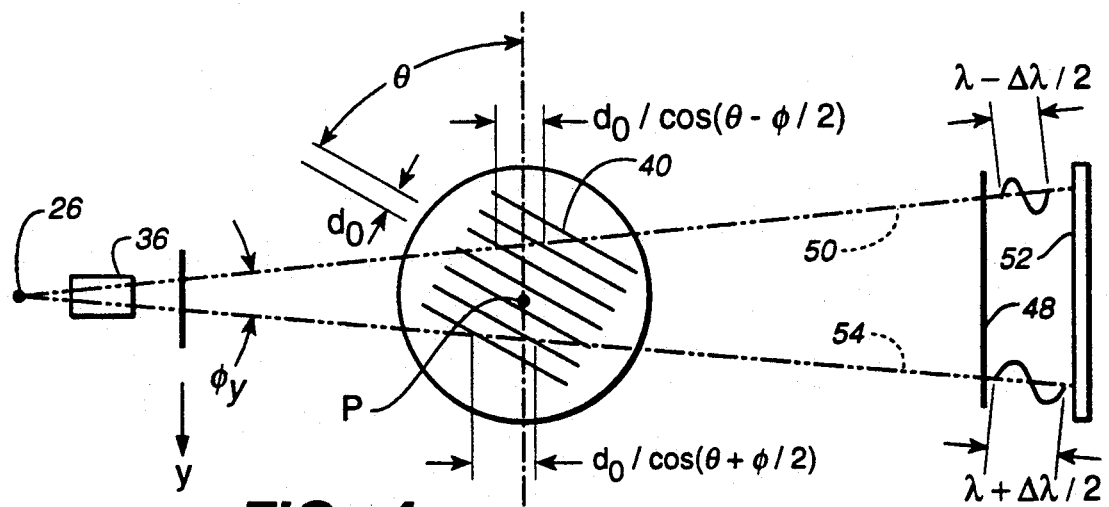
FIG._4

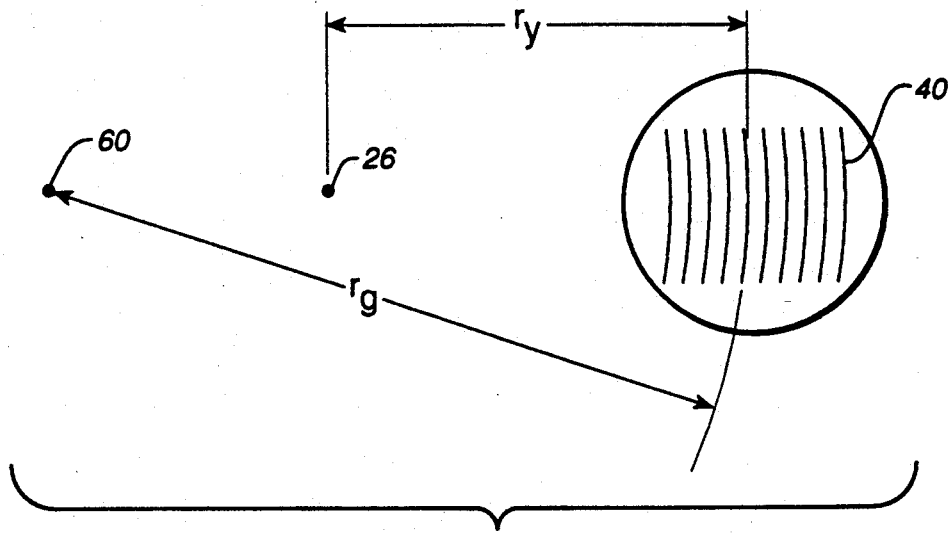
FIG._5A
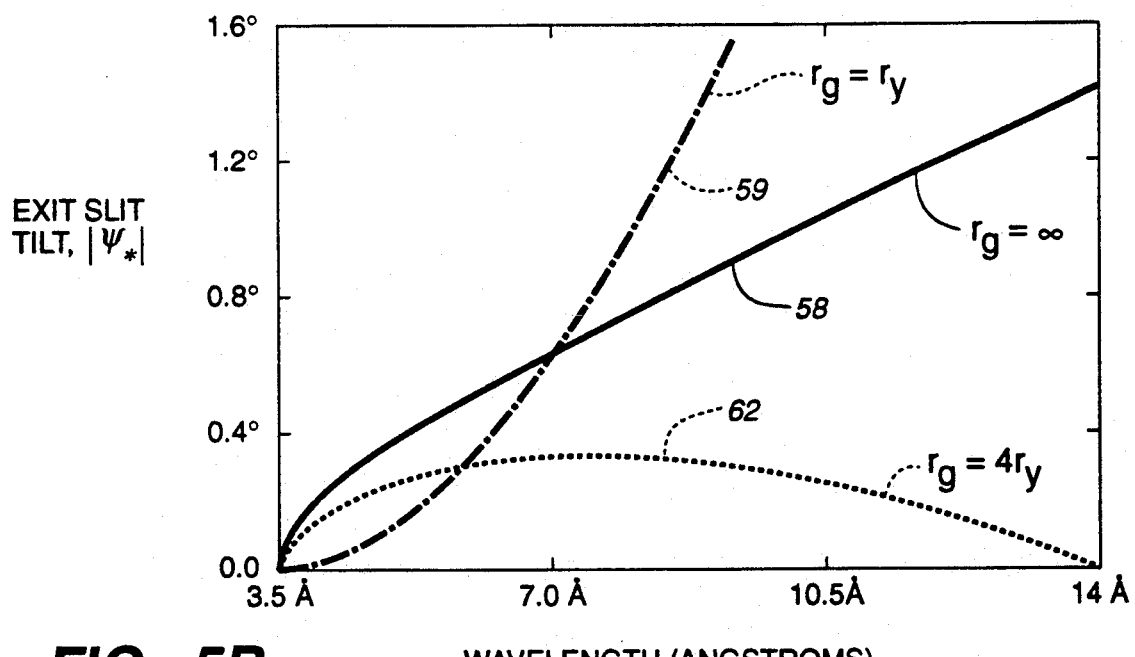
FIG._5B WAVELENGTH (ANGSTROMS)

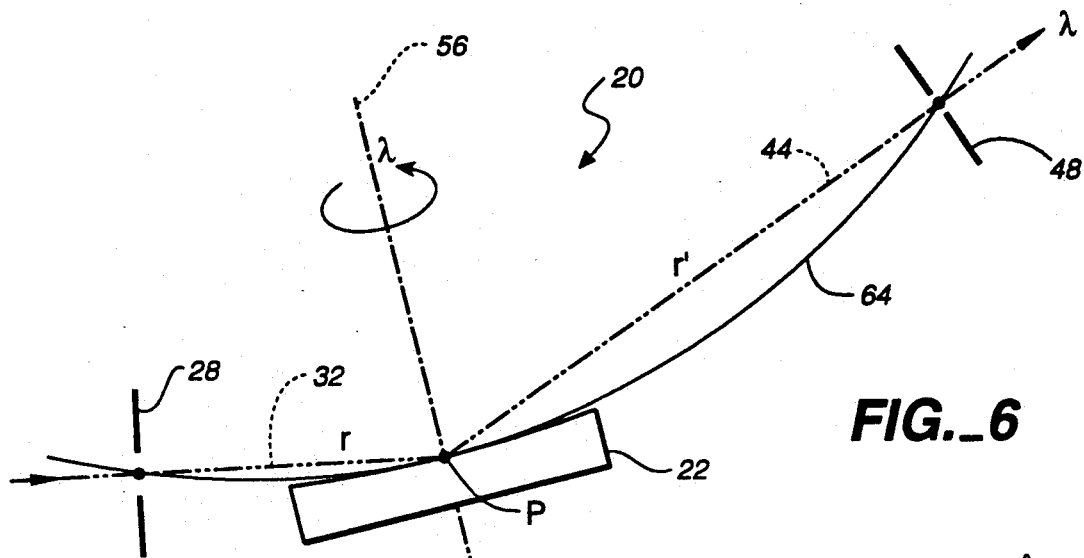
FIG._6
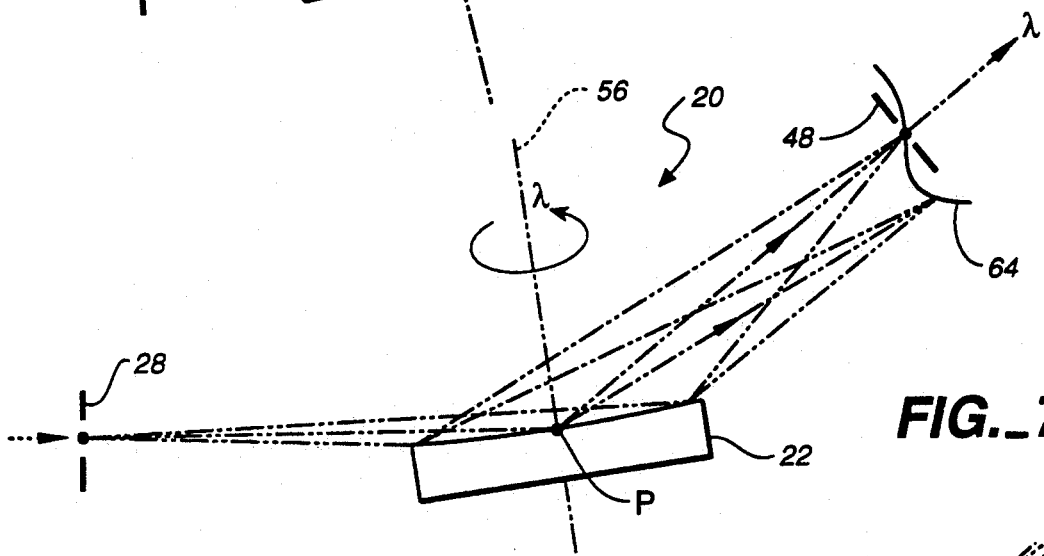
FIG._7
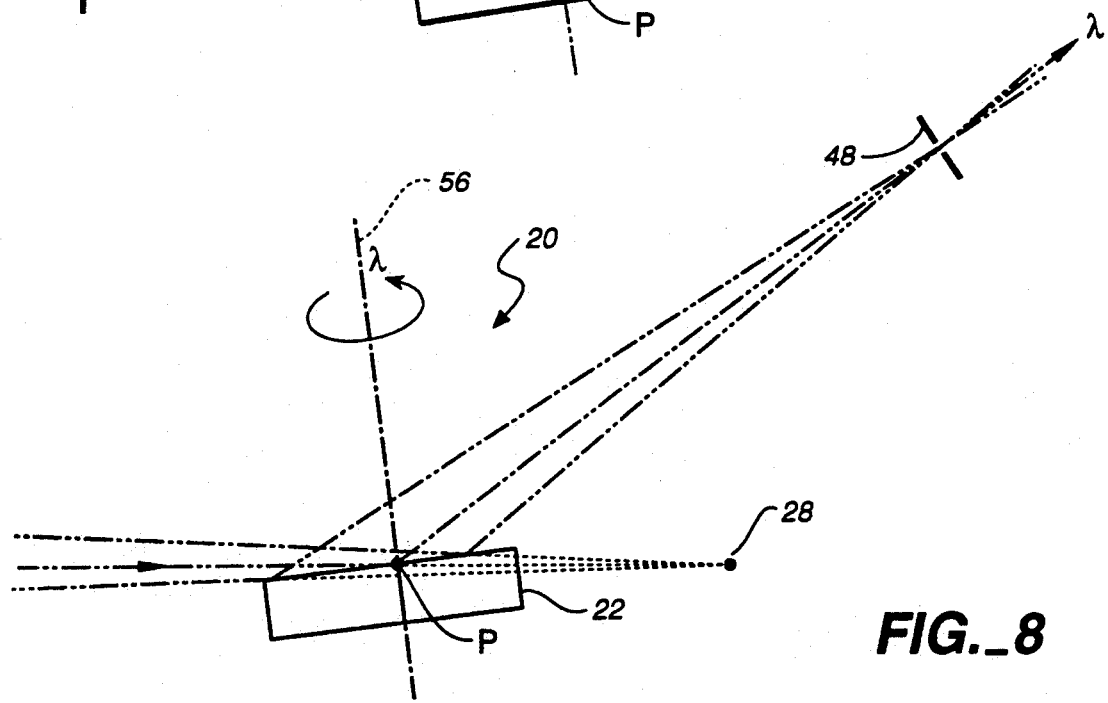
FIG._8

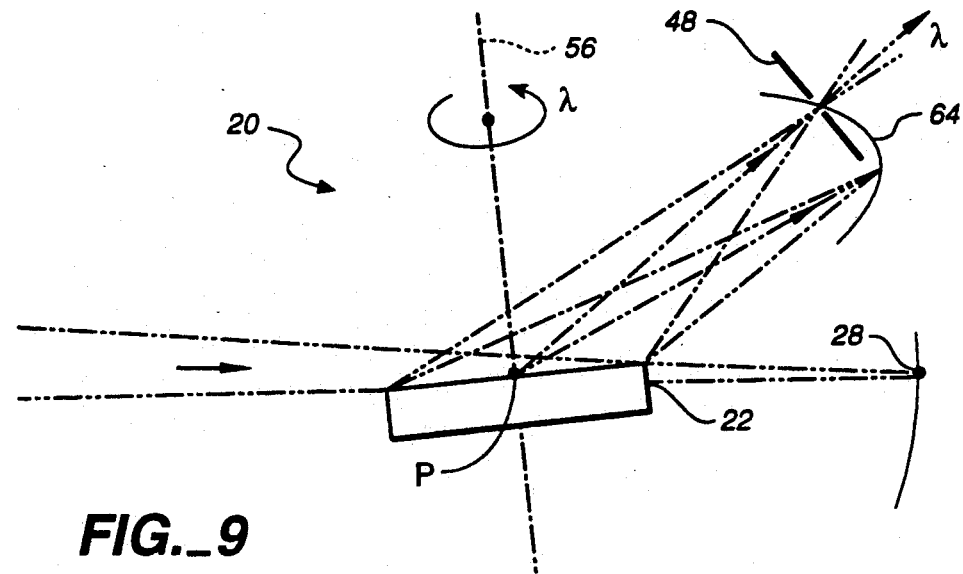
FIG._9
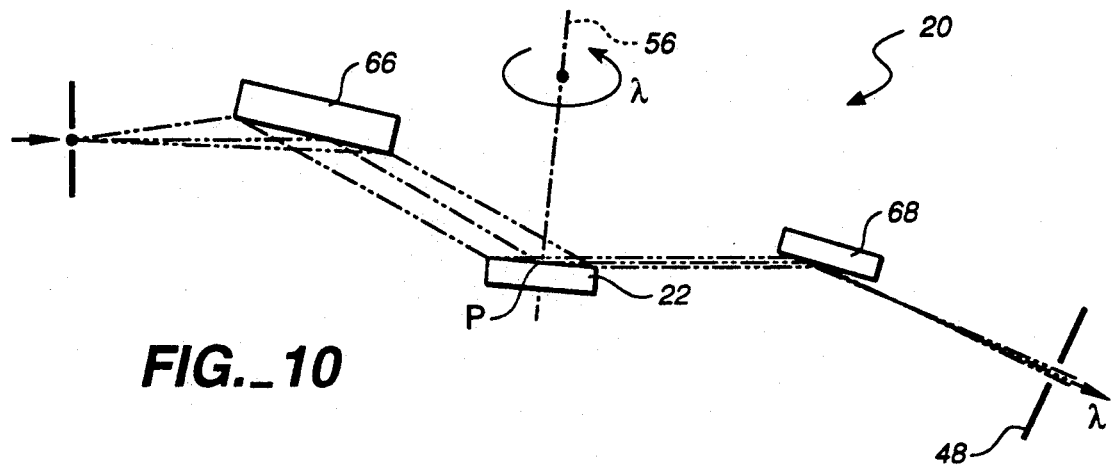
FIG._10
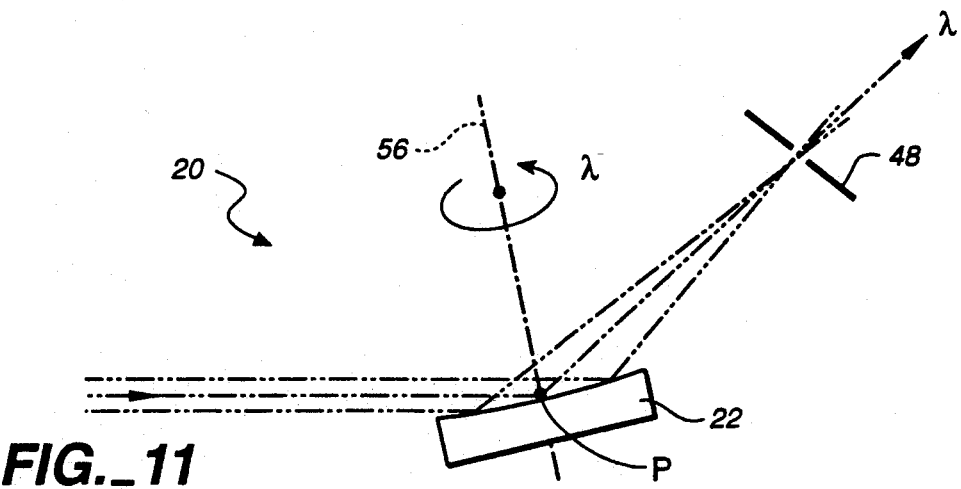
FIG._11

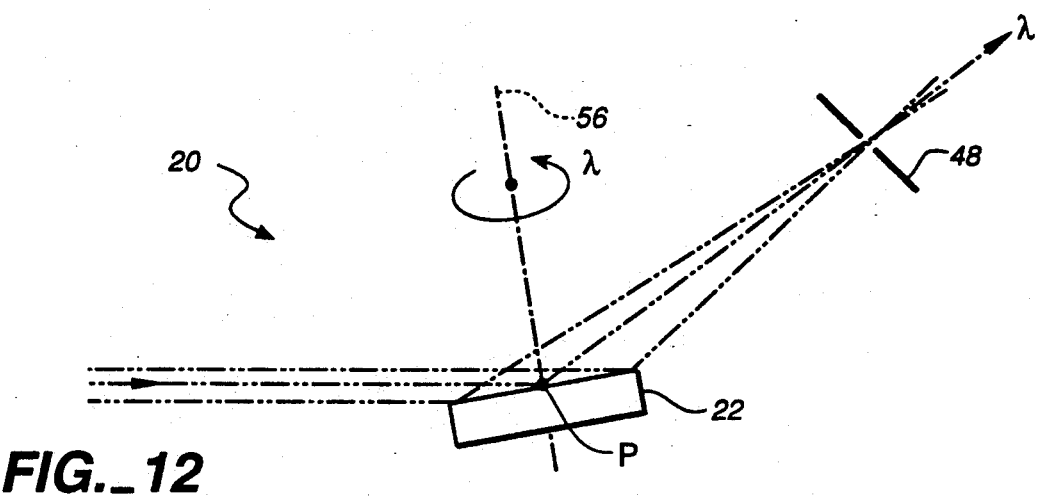
FIG._12
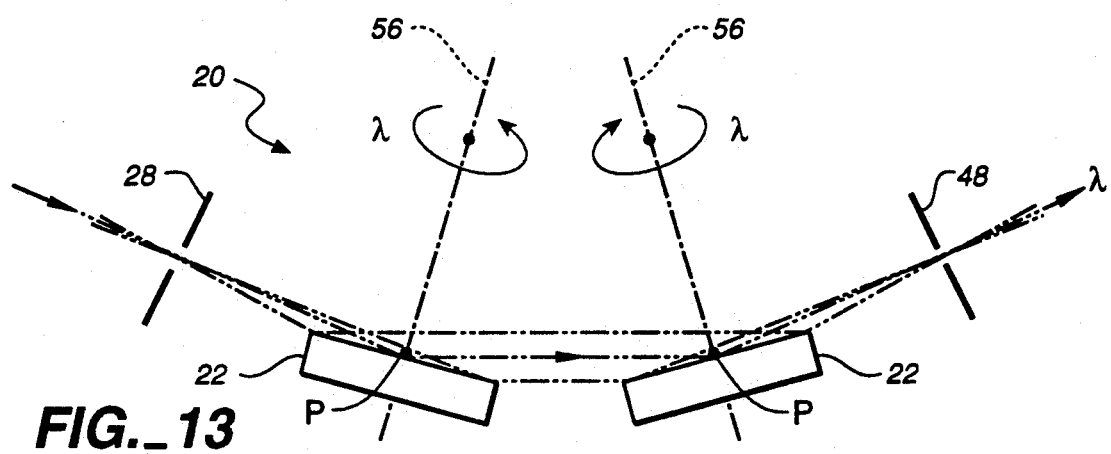
FIG._13
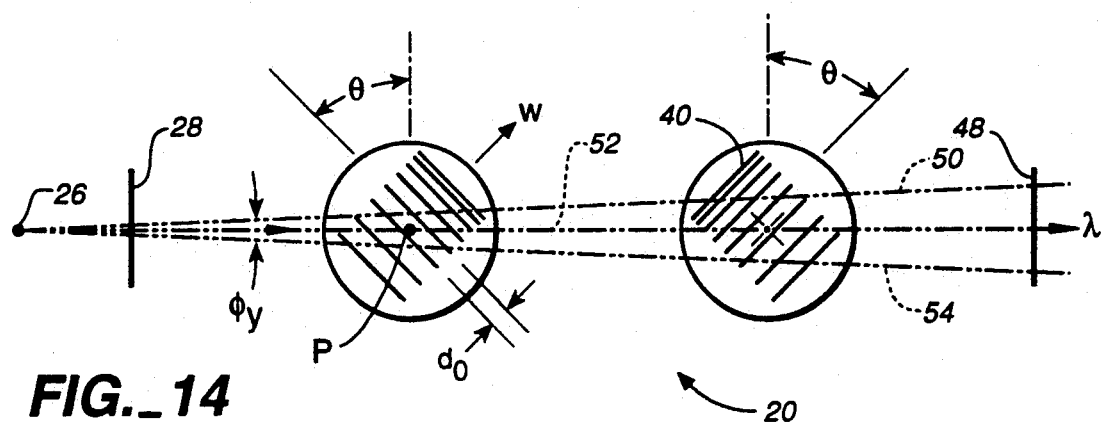
FIG._14

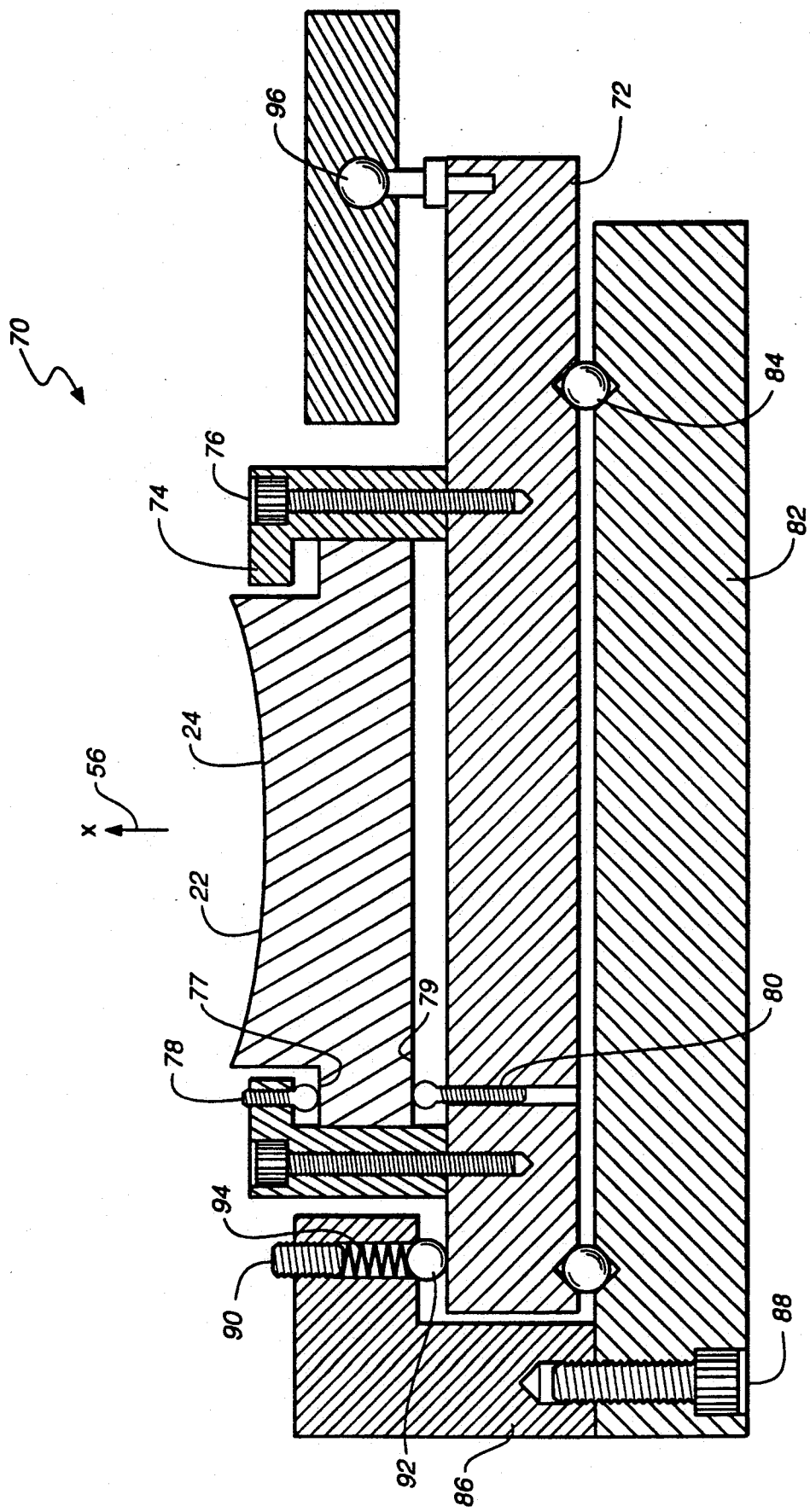
FIG._15

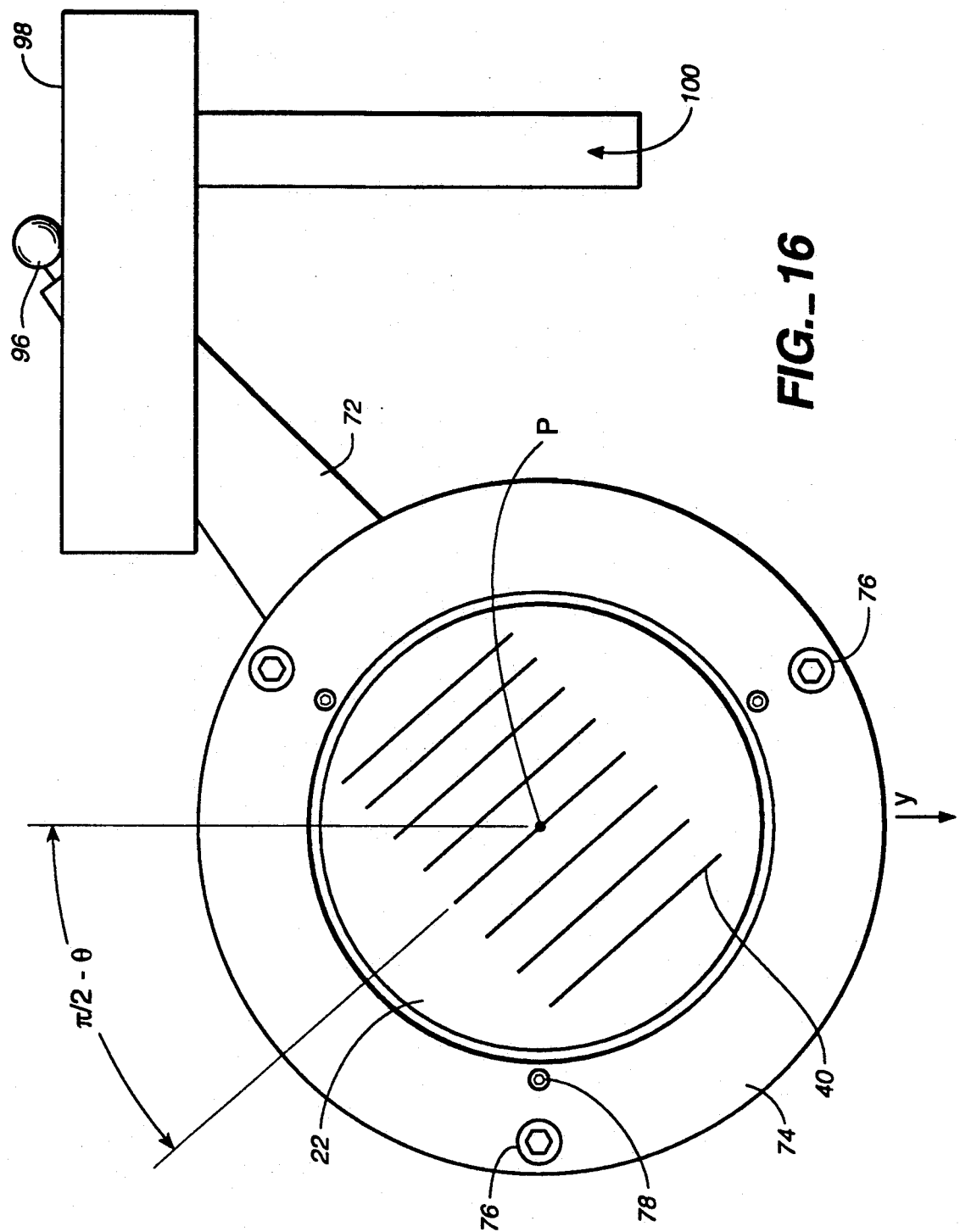
FIG._16

GRATING MONOCHROMATORS AND SPECTROMETERS BASED ON SURFACE NORMAL ROTATION

BACKGROUND OF THE INVENTION

This invention relates to a novel method and optical system which has inherent advantages over existing monochromators and scanning spectrometers employing diffraction gratings. The invention is particularly well adapted to use at grazing incidence.

Diffraction gratings have been widely used in spectroscopic analysis for over a century. In many experimental instances, it is necessary to change the wavelength which is diffracted to a fixed location. When such location presents a spatial filter (e.g. a slit or pinhole), the resulting monochromator is provided with means capable of scanning any wavelength from a limited spectral continuum through the exit. If a detector is placed at the grating focus in place of a slit, the resulting spectrometer often retains the need to tune the wavelength diffracted to the detector center.

In all such monochromators and spectrometers to date, the scanning (or tuning) of wavelength has been accomplished by movements of the grating (or separate auxiliary optics) within the dispersion plane which is normal to the grating grooves. As illustrated in FIG. 1, the only grating rotation motion employed in the prior art has been about an axis parallel to the grating grooves. The only other grating motions in the prior art have been translations within the plane normal to the grooves, and combinations of such rotation and translations. This constraint has been honored by all grating instruments, whether they be used at normal incidence or grazing incidence, for in-plane or off-plane diffraction, in reflection or transmission, and even when the groove spacings have been varied.

Unfortunately, such movements within the dispersion plane of the grooves alter the grating focusing. Often, this means the introduction of auxiliary mirrors and complicated scanning motions for the optics and possibly the slits to maintain a well focused image at all wavelengths. In addition, for all instruments except those which adhere to the Rowland circle [H. A. Rowland, Phil. Mag. vol 16 (1883), p. 197], the numerical aperture exiting a given size grating varies significantly with the selected wavelength as the grating is rotated. This imposes a limitation on the range in wavelengths which can be scanned with a single grating, and requires exit baffling to reject the rays which do not match the fixed aperture of most targets to which such radiation is directed.

The magnitude of all these effects is highest when the grating is operated at grazing angles to the incident radiation. Such illumination is required to efficiently reflect electromagnetic radiation having wavelengths shorter than approximately 1000 Å. Therefore spectroscopic instruments of the prior art exhibit a number of undesirable and cumbersome characteristics which compromise experiments performed in the vacuum ultraviolet (<1000 Å) and soft x-ray (<100 Å) regions of the spectrum.

For example, moving slits are usually required in monochromators based on the Rowland circle, such as the commercial design of McPherson in U.S. Pat. No. 3,211,049, the "Vodar" monochromator of Salle et al in Compt. Rend. vol. 230 (1950), p. 380, the adjustable monochromator of Tondello et al in U.S. Pat. No. 4,254,335, the "Grasshopper" monochromator of Brown et al in U.S. Pat. No. 4,398,823, and the monochromator of Kaffka in U.S. Pat. No. 4,605,306. Even the varied-space grating in the non-Rowland monochromator of Turner et al in U.S. Pat. No. 4,027,975 requires use ov moving slits. Auxiliary mirrors in addition to wavelength-dependent apertures are characteristic of plane grating monochromators, such as those of Itou et al, Appl. Opt. vol. 28 (1989), p. 146, Hettrick et al in U.S. Pat. No. 4,776,696 ("HIREFS"), Pouey in U.S. Pat. No. 4,241,999 ("Monograph"), Petersen in U.S. Pat. No. 4,553,253 ("SX-700"), Kabler et al in U.S. Pat. No. 4,462,689, Dietrich et al in Rev. Sci. Instrum. vol. 43 (1972), p. 434 ("Flipper"), and Werner et al in Appl. Opt. vol. 20 (1984), p. 23. Spectral images are not in focus for fixed-slit off-Rowland concave grating monochromators, such as the constant angle of incidence mounting of Axelrod in U.S. Pat. No. 3,495,909, the Johnson-Onaka monochromator of Onaka, Sci. Light vol. 7 (1958), p. 23, the toroidal grating monochromator ("TGM") of Madden et al, J. Opt. Soc. Am. vol. 62 (1972), p. 722, and the high-throughput monochromator ("HTM") of Hettrick et al, Appl. Opt. vol. 25 (1986), p. 4228. To maintain even an appropriate focus with fixed slits as such an off-Rowland concave grating is rotated, an auxiliary mirror and a translation of the entire optical system is required in the monochromator of Ishiguro et al in Rev. Sci. Instrum. vol. 60 (1989), p. 2105.

A couple self-focusing monochromator designs based on the use of varied-space gratings have avoided most, but not all of the above problems. Aspnes in U.S. Pat. No. 4,492,466 describes a clever cylindrical grating monochromator ("CGM") design in which the grating simply translates along its symmetry axis (within the dispersion plane) to select wavelength. This essentially maintains a stigmatic focus at a fixed exit pinhole without any auxiliary mirrors. However, the translation is enormous, leading to use of only a small fraction of the full grating aperture at any particular wavelength. Recently, Hettrick in U.S. Pat. No. 4,991,934 describes an In-Focus Monochromator ("IFM") whose grating scans wavelength by rotation about a fixed axis combined with a small linear translation along its surface. However, the grating rotation still leads to a wavelength-dependent output aperture, typically being approximately a factor of two over the scanned spectrum. If no such variation is tolerable (e.g. a given target aperture must be matched at all wavelengths), then the baffled exit aperture results in a factor of two loss in throughput at an extreme wavelength.

In the case of a flat-field spectrometer, designs employing a concave varied-space grating, such as that of Fonck et al in Appl. Opt. vol. 21 (1982), p. 2115 and Kita et al in Appl. Opt. vol. 22 (1983), p. 512, a rotation of the grating about its grooves results in significant changes in the focal length. The result is that such spectrometers are not tuneable in wavelength striking a fixed detector position unless additional auxiliary mirrors are employed.

Grating monochromators and spectrometers which change wavelength over a wide region at high efficiency without altering the spectral focus, the slit positions, or the beam aperture, and do not require auxiliary mirrors or complex scanning motions, would be a highly useful advance in the field of optics.

SUMMARY OF THE INVENTION

In accordance with the present invention, a novel and useful optical system for a monochromator is provided.

The system of the present invention (FIG. 2) employs a diffraction grating which scans the wavelength diffracted to a fixed location by rotating the grating about its surface normal. The incident rays then view a grating groove spacing which has increased by the inverse cosine of the rotation angle. The provides a wide scanning range without changing any geometrical positions or angles.

The absence of this simple scan motion in the prior art is presumably due to the unexpected result that the diffracted image remains in focus at grazing incidence. Most gratings are used at near normal incidence, and if such gratings were rotated about their surface normal, they would deflect the exiting radiation significantly in the direction along the unrotated groove. The general three-dimensional grating equation must then be used to determine the geometry of the outgoing beam. The resulting image focus at a fixed exit slit can be shown to remain good for (meridional) rays incident within the plane normal to the direction of the unrotated grooves, but to degrade sharply for (sagittal) rays incident out of this plane.

However, in the limit of grazing incidence these undesirable effects are unexpectantly found to vanish. While the general grating equation still holds, the image deflects only slightly along the exit slit length. The only other noticeable effect is a small wavelength-dependent tilt of the focused image relative to the grating surface. Even this small effect can be made negligible either by collimating the incident radiation along the direction of the unrotated grooves, or by curving the grooves.

At normal or near-normal incidence, the prior art rotation of a grating about an axis parallel to its grooves (thus lying within a plane tangent to the grating surface) has little effect upon the grating focusing. The classic example is the Seya-Namioka monochromator, which provides for minimum optical aberrations in this simple type of scan at an included angle of approximately 70° between the incident and diffracted rays. [Seya, Sci. Light Vol. 2 (1952), p. 8, and Namioka, J. Opt. Soc. Am. Vol. 49 (1959), p. 951]. However, at grazing incidence the included angle between the beams approaches 180°, and this same simple rotation results in severe defocusing at all wavelengths except two chosen ones, as discussed in a review by Hettrick, Nucl. Instrum. Meth. vol. A266 (1988), p. 404.

Surprisingly, the inverse situation is found to occur with the present invention of scan about the grating surface normal. Namely, the spectral focus degrades rapidly if the grating is operated at normal or near normal incidence, but remains sharp if the grating is operated at grazing incidence. This latter insensitivity to rotation about the surface normal is the new and useful result of the present invention. It is the only known case in the history of gratings where the optical aberrations are smaller at grazing incidence than they are at normal incidence.

Another striking distinction between the performance of surface normal rotation and the classical rotation about the groove direction is that meridional rays are mainly responsible for the optical aberrations in the classical case, whereas the sagittal rays are responsible for the main optical aberration in the present invention.

It may be apparent that an improved optical system for a monochromator or scanning spectrometer has been described.

It is therefore an object of the present invention to provide an optical system which is in focus at all scanned wavelengths.

Another object of the present invention is to provide an optical system which employs slits (or object and image) which are fixed in space.

Yet another object of the present invention is to provide an optical system whose exiting beam aperture is not wavelength-dependent.

A further object of the present invention is to provide a simple scan mechanism.

Another object of the present invention to provide an optical system which possesses high efficiency due to the presence of a minimum number of optical elements.

Yet another object of the present invention is to provide an optical system which enables scanning over a broad range in wavelength at high diffraction efficiency.

The invention possesses other objects and advantages especially as concerns particular characteristics and features thereof, which will become apparent as the specification continues.

BRIEF DESCRIPTION OF THE DRAWINGS

FIG. 1 is a perspective schematic of the prior art wavelength scanning motion of rotation about an axis parallel to the grooves.

FIG. 2 is a perspective schematic of the present invention wavelength scanning motion of rotation about an axis normal to the grating surface.

FIG. 3 is a side view of a preferred embodiment of the present invention.

FIG. 4 is a top view of FIG. 3 (with sagittal collimating mirror 38 removed), illustrating the orientation of the grating grooves following the prescribed rotation.

FIG. 5A is a schematic top view of a grating of the present invention in the general case when the grooves are curved. FIG. 5B plots the required tilt of the exit slit to correct for image tilt given the indicated groove radius of curvature.

FIG. 6 shows a schematic side view of a self-focusing equally-spaced grating embodiment, which improves over Rowland circle monochromators, or other monochromators and spectrometers employing classical concave gratings.

FIG. 7 shows a schematic side view of a self-focusing varied-space grating embodiment, which improves over the "IFM" monochromator and concave grating flat-field spectrometers.

FIG. 8 shows a schematic side view of a converging beam equally-spaced grating embodiment, which improves over the "SX-700" or other Monk-Gillieson type monochromator.

FIG. 9 shows a schematic side view of a converging beam varied-space grating embodiment, which improves over the "HIREFS" monochromator/spectrometer.

FIG. 10 shows a schematic side view of a collimator-grating-camera embodiment, which improves over a conventional Czerny-Turner plane grating monochromator.

FIG. 11 shows a schematic side view of a collimated beam focusing grating embodiment allowing a classical "Wadsworth"-type concave grating to be used as a grazing incidence monochromator having a fixed exit slit.

FIG. 12 shows a schematic side view of a collimated beam focusing plane varied-space grating embodiment, which improves over the monochromator of Itou et al.

FIG. 13 shows a schematic side view of a double-grating monochromator embodiment, which improves over the complex scan motions and auxiliary mirrors required for other double-grating monochromators.

FIG. 14 shows the top view of FIG. 13, illustrating the complimentary scan motions necessary to reduce image tilt.

FIG. 15 shows a diagrammatic side elevational view in partial section of the mechanical assembly of the present invention.

FIG. 16 is a top plan view with some elements removed for clarity.

Drawing referenced numerals:
20—optical system
22—diffraction grating
24—grating surface
26—light source
28—entrance slit
30—incident meridional extremum ray
32—incident principal ray
34—incident meridional extremum ray
36—pre-optic (meridional focusing or asphere)
38—sagittal focusing mirror
40—grating groove
42—diffracted meridional extremum ray
44—diffracted principal ray
46—diffracted meridional extremum ray
48—exit slit
50—extremum sagittal ray
52—target
54—extremum sagittal ray
56—grating rotation axis
58—tilt of image from straight grooves
59—negative tilt of image from grooves concentric about source
60—center of grating groove curvature
62—tilt of image from curved grooves
64—focal surface of grating
66—collimating mirror
68—camera mirror
70—grating rotation mechanism
72—grating top rotation plate and bar
74—grating clamp
76—grating clamp mounting bolt
77—grating substrate lip surface
78—3-point top adjustment screw
79—grating substrate back side
80—3-point bottom adjustment screw
82—rotation plate base
84—bearing ball or roller
86—top plate preload clamp
88—preload clamp mounting bolt
90—spring-loaded ball plunger
92—rotating contact ball
94—spring
96—rotation drive tooling ball
98—cosine drive plane
100—linear translation means

DESCRIPTION OF THE PREFERRED EMBODIMENTS

Various aspects of the invention will evolve from the following detailed description of the preferred embodiments thereof which should be taken in conjunction with the hereinbefore described drawings.

The optical layout of one embodiment of the invention as a whole is shown in FIG. 3 and 4 by referenced character 20. Optical system 20 includes at a minimum a diffraction grating 22. The grating has a surface 24 which is reflective or otherwise responsive to the electromagnetic radiation of interest which is emitted by a light source 26 and passes through an entrance slit 28 along a principal axis 32. In practice, a fan of rays between extremum rays 30 and 34 will be incident to the grating in the meridional plane defined by FIG. 3.

Pre-optics 36 may be inserted between the source and the entrance slit in order to efficiently direct the passage of such light. The surface 24 of the grating is composed of a set of minute grooves 40 which provides an interference pattern in the diffracted (e.g. reflected) beam exiting the grating along a principal axis 44. In the case of the reflection grating illustrated, the incident extremum ray 30 will become ray 42 following diffraction, and incident extremum ray 34 will become ray 46. An exit slit 48 may be employed to allow passage of an exceedingly narrow band of wavelengths $\Delta\lambda$ to a target or other detection means 52. In this manner, optical system 20 effectively transmits only a desired wavelength emitted by the source, and hence performs the function of a monochromator.

To provide selection of the desired transmitted wavelength, the grating is simply rotated about its surface normal 56 so as to scan a continuous band of wavelengths past the exit slit. To maintain a fixed beam direction for principal light rays 32 and 44 which intersect at the grating center (or pole P), the rotation axis is preferred to pass through this point. The angles of incidence, $\alpha$, and diffraction, $\beta$, are defined for the principal rays, 32 and 44 respectively, relative to the grating surface normal 56. The wavelength, $\lambda$, transmitted through exit slit 48 will change as the grating is rotated by an angle $\theta$ about axis 56 according to the relation:

$$\lambda = \lambda_o / \cos\theta \qquad (1)$$

where $\lambda_o$ is the minimum accessible wavelength provided when $\theta=0$ so that the grooves are oriented normal to the plane of FIG. 3. In contrast to the prior art, neither $\alpha$ nor $\beta$ need to vary in order to change the wavelength.

I define a right-handed rectilinear coordinate system with the x-axis normal to the grating surface and coincident with the rotation axis 56, the y-axis parallel to the direction of the unrotated grooves, and the z-axis along the tangent to the grating surface at pole P. Thus, the plane x-z is the classical dispersion plane prior to rotation of the grating, and classical astigmatism is in the y direction. Nominally, entrance and exit slits would be oriented with their minor dimension in a plane perpendicular to y and their lengths parallel to y.

Given a finite rotation angle $\theta$ about the x-axis, it can be shown from the general grating equation (and by numerical raytracings) that incident ray 32 will deflect to a y coordinate of:

$$y = r'(m\lambda_o/d_o)\tan\theta = r'(\sin\beta - \sin\alpha)\tan\theta \qquad (2)$$

at the exit slit, where $d_o$ is the nominal groove spacing, m is the spectral order, r' is the line-of-sight distance from the grating pole P to the exit slit. At normal or near-normal incidence, the dimensionless factor $m\lambda_o/d_o$ is typically a large fraction of unity, resulting in an unacceptably large deflection. For example, consider a 1000 g/mm grating ($d_o=1/1000$ mm) and a minimum wavelength $\lambda_o=1700$ Å. For operation in the first spectral order (m=1), the dimensionless factor is thereby 0.17. If the grating is to scan wavelengths up to a maximum value of 3400 Å, then equation 1 indicates a maximum rotation angle $\theta=60°$. For a focal length $r'=1$ meter, equation 2 then reveals a deflection of approximately 300 mm. In addition, it can be shown from raytracings that sagittal rays (e.g. 50 and 54 of FIG. 4) are very poorly focused.

In contrast, now consider an x-ray grating operated at an extreme grazing angle of 1°. The grating spacing is 1/500 mm and wavelength $\lambda_o$ is 5 Å. At the same focal length of 1 meter, a 60° grating rotation results in the scanned wavelength of 10 Å deflecting by only 0.43 mm along a fixed exit slit. This is due to the dimensionless factor ($m\lambda_o/d_o$) being only 0.00025. Raytracings reveal that the resulting image quality remains high, even for extremum sagittal rays 50 and 54.

A practical mechanical advantage is evident in the present invention. As shown, a factor of two in wavelength selection occurs over a 60° rotation of the grating about its surface normal. At a 1° graze angle, the prior art rotation about the groove direction (FIG. 1) would typically require less than 0.5° of rotation. This would make the wavelength selection extremely sensitive to small changes in the rotation angle, imposing a demanding accuracy requirement on the rotation mechanism. In the present invention, the wavelength is approximately one to two orders of magnitude less sensitive to errors in the rotation angle, enabling use of inexpensive mechanical components having loose tolerances.

At grazing angles, the limit to the spectral resolution of the present invention can be simply derived (without resort to the general three-dimensional grating equation) by reference to FIG. 4. The source of this aberration is the range of groove spacings as projected upon the plane normal to the grating surface and containing the incident ray. If the incident radiation is either converging or diverging by a numerical aperture angle of $\phi$ in the y-a plane, then the extremum rays 50 and 54 will view slightly different spacings as the grating is rotated. Assuming the grooves are straight and parallel, and that the exit slit is oriented along the y-axis, this results in a variation in wavelength of $$\Delta\lambda/\lambda = \phi \tan \theta \quad (3)$$

diffracted through an infinitesimal exit slit width. In the above grazing incidence example, the result is a spectral resolving power of $\lambda/\Delta\lambda=600$ for a 1 mrad numerical aperture in the y-direction, typical of the beam aperture for such short wavelength radiation.

If higher resolution, or a larger beam aperture is required, then there are several options. First, the exit for entrance slit) could be rotated to coincide with the tilted image at each scanned wavelength. From equation 3 and the classical grating equation, the required exit slit tilt can be derived as a function of the scanned rotation angle:

$$\psi = \frac{m\lambda_o/d_o}{1 + r_y/r'} \cdot \frac{\tan \theta}{\cos \beta} \quad (4)$$

where $r_y$ is the line-of-sight distance from an assumed point source (in the y-direction) to the grating pole P. Numerical raytracings conform that the image width normal to the rotated slit has not degraded by any measurable amount relative to that of the optimized unrotated grating operated at $\lambda_o$. In the above grazing incidence example with an expanded sagittal aperture of 10 mrad, numerical raytracings have confirmed that a 5 micron image width is maintained over a 10 mm long exit slit for all wavelengths over an extended scan range of 5 Å–20 Å. The rotation scan angle was therefore as large as 75.52° as given by equation 1.

The magnitude of this tilt is very small, only approximately 1° for the above example, as shown by curve 58 of FIG. 5. Entrance slit 28 or exit slit 48 are thus ideally provided with a small rotational adjustment of the slit length direction relative to the y-axis. This may a commercially available slit assembly mounted to a rotary bearing.

A second possible remedy to the small image tilt is the use of curved grooves. As illustrated in FIG. 5, the grooves 40 are curved towards the light source 26 to maintain a nearly constant angle relative to both extremum sagittal rays 50 and 54. For the illustrated case of divergent rays, the light source is real and the grooves are curved towards the incident direction. In the case where the rays are convergent, the light source would be a virtual point located in the diffracted direction on the opposite side of the grating, and the grooves would be curved towards that direction. Prior to any grating rotation, the optimum grooves would be concentric about the source point 26. The resulting image tilt is corrected only small rotation angles (for wavelengths scanned near the minimum wavelength), as shown by curve 59. At a finite rotation angle $\theta$, the optimum groove radius is larger due to the $1/\cos\theta$ elongation factor of the groove length subtending extremum rays 50 and 54. Thus, to a first order of approximation, the optimum groove curvature is $r_y/\cos\theta$, and such grooves are concentric about point 60. Substituting in terms of wavelength for $\cos\theta$ from equation 1 one finds in general that the image tilt at the exit slit is modified from equation 4 to be:

$$\psi* = \psi \cdot [1 - (r_y/r_g)\lambda/\lambda_o)] \quad (5)$$

where $r_y$ is the distance from an assumed point source in the y-direction to the grooves, and $r_g$ is the groove radius of curvature in the y-z plane. The best compromise for a fixed groove curvature radius is clearly ($\lambda_{max}/\lambda_o)r_y$, for which the tilt is zero at both $\lambda_o(\theta=0)$ and $\lambda_{max}$. FIG. 5 reveals the result of calculations (curve 62) showing a factor of 4 reduction in the image tilt over a factor 4 in wavelength. In practice, the magnitude of this image tilt is sufficiently small that no actual tilt of the exit slit is required.

A third solution to maintaining optimum spectral resolution, without resort to a tilted slit or curved grooves, is to collimate the incident radiation in the y-direction. In this case there is no variation, to first degree, in the groove spacings viewed by rays striking different regions along the groove lengths. Image rotation can thus be eliminated by providing focusing in the direction of the slit length. A mirror 38 may be interposed anywhere between the light source 26 and the target 52. If mirror 38 is concave and oriented with its surface normal parallel to the entrance slit, it can collimate the incident radiation in the y-z plane of FIG. 4.

While a spherical surface is adequate, the surface could also be an ideal cylinder of parabolic cross-section. Alternatively, mirrors 36 and 38 may be combined into a single mirror (e.g. an asphere) which both focuses the source through the entrance slit in the x-direction and collimates the light in the y-direction. It is additionally clear that spherical or cylindrical mirror 38 or aspherical mirror 36 may be used to alternatively provide a convergent beam in the y-z plane which comes to a sagittal focus at detection means 52 or at some other useful position.

Because the scanned wavelength λ scales proportional to the projected groove spacings, the image focus remains unchanged (apart from its rotation) as a function of wavelength. If the grating is initially optimized for best focus at a single wavelength, the prescribed rotation will provide an in-focus image at all other wavelengths within the scan range of the grating. For a rotation angle of 60°, this is a factor of two; a rotation angle of 75° yields approximately a factor of 4 scan in wavelength.

Such a scan motion can be used to advantage with any geometric form of incident radiation (collimated, diverging, converging) and any type of grating (surface curved or planar, groove pattern equally spaced or varied spaced). The general equations governing grating focusing in this case are well known in the prior art [Harada et al in U.S. Pat. No. 4,312,569 or Hettrick et al in U.S. Pat. No. 4,776,696]. To a first degree of accuracy, the spectral image at wavelength $\lambda_o$ is in focus if the following equations are met:

$$m\lambda_o/d_o = \sin\beta - \sin\alpha \quad (6)$$

and $$\cos^2\alpha/r - \cos\alpha/R + \cos^2\beta/r' - \cos\beta/R + m\lambda_o a_1 = 0 \quad (7)$$

where r is the line-of-sight distance from P to the entrance slit, r' is the line-of-sight distance from P to the exit slit, R is the radius of curvature of the grating and where $a_1$ is the linear variation in the groove density along the chord to the surface measured normal to the grooves:

$$1/d_z = 1/d_o + a_1 w \quad (8)$$

where w is the ruled width coordinate measured along this chord. The chord is coincident with coordinate axis z from FIG. 3 when θ=0, and w is defined to be zero at point P. Distance r is positive if the light diverges from the entrance slit to the grating (a "real" source) and is negative if the light converges onto the grating (a "virtual" source). Similar r' is positive if the light converges from the grating to the exit slit, and is negative if the light diverges from the grating (a virtual image). The grating surface radius R is positive if concave and is negative if convex. Collimated light ascribes values of infinity to r or r', and a plane grating is described by R=∞.

Any type of optical system of the present invention can be specified by the sign and finiteness of r, r', R, $a_1$ and by the fact that the transmitted wavelength is varied to values larger than $\lambda_o$ by rotation of the grating about its surface normal. Table I lists the possible combinations of these parameters and assigns a Roman numeral to the type of system so constructed in the present invention. FIGS. 6–12 illustrate several examples of new grating instruments made possible by this scanning motion. It should be noted that detailed numerical values for these four parameters, as well as the numerical values for the nominal groove spacing $d_o$ and the angles of incidence and diffraction, α and β, are selected to meet the requirements of particular experiments and do not change the type of system constructed. In the case of fixed slit positions, it will be recognized to those of skill in the art that designs where $a_1 \neq 0$ will be further limited in fractional wavelength resolution $[\Delta\lambda/(\lambda - \lambda_o)] = a_1 w d_o$, which is simply equal to the fractional change in the groove density following grating rotation.

TABLE I

GRATING SYSTEMS BASED ON SURFACE NORMAL ROTATION

| TYPE | Object Dist. r | Image Dist. r' | Radius R | $a_1$ |
|---|---|---|---|---|
| SNR-I | + | + | + | 0 |
| SNR-II | + | + | +, −, ∞ | ≠0 |
| SNR-III | − | + | +, −, ∞ | 0 |
| SNR-IV | − | + | +, −, ∞ | ≠0 |
| SNR-V | ∞ | ∞ | ∞ | 0 |
| SNR-VI | ∞ | + | + | 0 |
| SNR-VII | ∞ | + | +, −, ∞ | ≠0 |

In table I, the present invention is denoted by the acronym prefix SNR (for "Surface Normal Rotation") and by a Roman numeral suffix. Seven design types of preferred embodiments are listed.

Type SNR-I is illustrated in FIG. 6. A classical equally-spaced ($a_1 = 0$) concave grating (R>0) accepts the radiation diverging (r>0) from entrance slit 28 and focuses it (r'>0) through exit slit 48. Even if the slits are fixed in position, the grating focusing is unchanged as the grating is rotated about its surface normal 56 to select wavelength. For clarity, rotation axis 56 is illustrated to pass through the grating center, but it could similarly be any displaced axis substantially parallel to the grating surface normal. Entrance and exit slits can be positioned on the Rowland circle of the grating (r=R cosα, r'=R cosβ). In this case, both defocusing and coma of the image are zero at all scanned wavelengths. Compared to the classical Rowland circle monochromator, the present invention has the advantage of no moving slit and fixed beam directions. Compared to off-Rowland "TGM" or "HTM" designs, the present invention has the advantages that it is always in focus and has a wavelength-independent aperture.

Type SMR-II is illustrated in FIG. 7. A grating is employed whose spacings vary across its surface ($a_1 \neq 0$). In this way, object and image distances r and r' can be adjusted independent of each other to suit the aperture requirements of a particular experiment, to reduce higher-order aberrations or to provide a flat field (r and r' approximately equal) at detection surface 64. The grating surface may be either concave (R>0), plane (R=∞), or convex (R>0). As in the system of FIG. 6, the grating accepts divergent light (r>0) from entrance slit 28 and focuses the light (r'>0) through exit slit 48 or to detector surface 64. As a monochromator, the present invention provides a wavelength-independent aperture (unlike the "IFM"). As a spectrometer, it has the advantage of a tuneable wavelength, which improves over the flat-field concave grating spectrometers of the prior art.

Type SNR-III is illustrated in FIG. 8. A classical equally-spaced grating ($a_1 = 0$) is placed in convergent light (r<0). Optically speaking, the object is the virtual entrance slit 28. In the case of a plane grating surface ($R=\infty$), this is a Monk-Gillieson mounting. However, given rotation about axis 56, the focal length r' now remains constant for all wavelengths. This is a significant improvement over the extreme variation in focal length which occurs if the grating were rotated in the prior art manner about its grooves. Compared to the "SX-700" which provides a rotating and translating auxiliary mirror to cancel this variation, the present invention requires no such mirror, has a much simpler scanning motion and a wavelength-independent aperture.

Type SNR-IV is illustrated in FIG. 9. A varied-space grating ($a_1 \neq 0$) is placed in convergent light ($r<0$). In this way, object and image distances r and r' can be chosen independent of each other to provide a normal incidence focal surface 64 (typically r' and $-r$ are approximately equal), to minimize higher order aberrations, or to suit the aperture requirements of a particular experiment. The grating may be concave ($R>0$), plane ($R=\infty$), or convex ($R>0$). By rotation of the grating about axis 56, the spectrum remains in focus at exit slit 48 or detector surface 64. Compared to the "HIREFS" spectrometer/monochromator, the present invention has a wavelength-independent aperture and is theoretically in better focus at a fixed exit slit.

Type SNR-V is illustrated in FIG. 10. A collimating mirror 66 provides a parallel beam of radiation ($r=\infty$) to a classical ($a_1=0$) plane ($R=\infty$) grating 2. The diffracted collimated radiation ($r=\infty$) is refocused by camera mirror 68 through exit slit 48. The equations governing mirror focusing are the same as equations 6-7 with $m=0$. Given a rotation of the grating about its surface normal 56, the numerical apertures of the incident and exiting radiation remain unchanged as the wavelength is varied. If the source of the incident radiation is inherently collimated or sufficiently distant (r is exceedingly large), the collimating mirror 66 may be eliminated. This monochromator represents an improvement over the classical Czerny-Turner monochromator in that the aperture is now wavelength-independent.

Type SNR-VI is illustrated in FIG. 11. A classical ($a_1=0$) concave ($R>0$) grating accepts collimated radiation ($r=\infty$) and focuses it ($r'>0$) through exit slit 48. In the past, such a "Wadsworth"-type mounting could not be used at grazing incidence, because the focal length changed given the prior art grating rotation about its grooves. However, in the present invention, rotation of the grating about its surface normal maintains an unchanging focus at a fixed slit 48 throughout the scan in wavelength.

Type SNR-VII is illustrated in FIG. 12. A varied-space grating ($a_1 \neq 0$) accepts collimated radiation ($r=\infty$) and focuses it ($r'>0$) through exit slit 48. The wavelength is selected by rotating the grating about its surface normal 56. This maintains a precisely in-focus image at all wavelengths, and does not require auxiliary mirrors. Such a system therefore represents a significant improvement over the monochromator of Itou et al.

FIGS. 6–12 illustrate only the cross section of the various design examples taken in the x-z plane of FIG. 3. Of course, additional optics can be inserted in such systems to provide sagittal focusing (along the y-axis) without departing from the principles of the present invention. In addition, pre-optics such as mirror 36 of FIG. 3, and post-optics can be used to efficiently direct radiation from the light source and to the final means of detection 52 or 64.

Given the virtual elimination of significant optical aberrations in the monochromatic image, the finite linear dispersion becomes the limiting factor in determining the attainable spectral resolution of such a system. In FIGS. 13 and 14, a pair of gratings are arranged in series, with additive dispersions. A second advantage of such multiple grating systems is that, if the gratings are rotated in opposite senses (clockwise and counterclockwise) about their respective surface normals, the image tilt produced by the first grating is largely cancelled by the second.

Such a double-grating system could take a variety of specific forms without departing from the uniqueness of the present invention. For example, while the gratings can be of any type, they are depicted here to be identical gratings of the varied-space type with planar surfaces. They could also be classical concave gratings, such a system being in effect a symmetrical combination of a pair of the gratings illustrated in FIG. 11. The incident beam can also be of any type (converging, collimated or diverging, but again for clarity it is illustrated to be diverging from entrance slit 28. In this example, the first grating is shown to collimate the beam in the x-z plane, while the second inverts this process by refocusing it through exit slit 48. In addition, the grating surface normals could point in opposing directions (180° apart), for which the radiation exiting the system would be parallel to the incident rays. In such a geometry, double dispersion is maintained by use of an intermediate focus midway between the gratings.

Alternatively, the path length for all meridional rays (principal and extreme) may be made constant by use of two (or more) such gratings arranged such that the dispersions cancel. This could take the form of gratings faced as illustrated in FIG. 13, but with the radiation converging to an intermediate focus at the symmetry plane between the two gratings; or the grating surface normals could oppose each other by 180°, in which case the radiation would be collimated between the gratings. Such a (common path length) monochromator preserves the time resolution of the incident beam, and is therefore of interest in the context of pulsed sources.

Due to the increased effective groove spacing with increased wavelength (FIG. 4), the diffraction efficiency of the present invention is maintained higher over the scanned wavelengths than for classical rotation about the central groove. However, the efficiency is not as high as can theoretically be achieved with continuous on-blaze designs such as those of Vincent in Appl. Opt. vol. 18 (1979), p. 1780, Maystre in Topics in Current Physics vol. 22 (Springer, Berlin, 1980), Werner in Appl. Opt. vol. 20 (1981), p. 487, Hunter in Appl. Opt. vol. 23 (1984); p. 293 and Aspnes in U.S. Pat. No. 4,492,466.

The pure rotation leads to a simple and compact mechanical design using commercially available components. However, some care must be taken to ensure that the rotation axis 56 is exactly normal to the grating surface at its pole. For example, if the grating is simply rotated about the axis normal to its back surface, and this surface makes an angle relative to the reflective surface on the front side, then the angles of incidence and diffraction will unintentionally change as the grating is rotated. This will cause an undesirable shift in the wavelength scale and some amount of defocusing in the image.

To minimize such effects, FIG. 15 illustrates one possible rotation mechanism 70. Grating 22 is connected to a top rotatable plate and bar 72 by use of annular clamp 74 which is rigidly attached to plate 72 by mounting bolts 76. Three adjustment screws 78 are threadingly engaged in clamp 74 and three opposing adjustment screws 80 are threadingly engaged in plate 72. To prevent distortion of the grating surface 24, each pair of screws 78 and 80 is positioned along a single line which is perpendicular to grating substrate lip surface 77 and back side 79. The adjustment screws are ball-ended to provided point contact with the substrate. In this way, a 3-pint mount is realized which provides adjustment of the grating surface so that it is perpendicular to rotation axis 56 of plate 72.

Top plate 72 with mounted grating 22 is rotated over base plate 82 by use of a number of bearing rollers or balls 84. Axial motion in the vertical direction along axis 56 is prevented by a preload between plate 72, balls 84 and plate 82, and thus a thrust bearing is thereby realized. This preload is provided by plungers 90 whose spring 94 pushes ball 92 against the top surface of plate 72. Several plungers 90 are placed in clamp plate 86 which is rigidly attached to bottom plate 82 by use of mounting bolts 88. The balls 92 are free to rotate so as to allow a smooth rotation of plate 72 relative to these fixed pre-load points.

Plate and bar 72 is caused to rotate about axis 56 to an angle $\theta$ by driving of a tooling ball 96 which is rigidly embedded in bar 72. As illustrated in FIG. 16, plane surface 98 is oriented perpendicular to the line connecting the center of ball 96 and the grating center P when grooves 40 are oriented at an angle of $\theta=0$. [For simplicity, bar 72 is depicted to be perpendicular to the grooves 40, but this choice is arbitrary]. With plane surface 98 driven along its normal by translation means 100, equal distances of translation result in equal changes in the value of $\cos \theta$. As this term is inversely proportional to the wavelength (equation 1), there is linearity between translation of surface 98 and the photon frequency given as $\nu=c/\lambda$, where c is the speed of light. The photon energy is $E=h\nu$, where h is Planck's constant, or E (in electron volts)$=12,398/\lambda$ (in Å units). This "cosine bar" is an interesting analog of the sine bars used in the prior art, for example that taught by Wilson in U.S. Pat. No. 4,612,233. Of course, the illustrated linear cosine-bar could be replaced by any non-linear mechanism, such as a simple rotary gearing, and the conversion to wavelength performed by calculation.

In practice, linear translation means 100 comprise various commercially available gears, bearings, motors, cranks, counters, etc. as convenient for the particular application, and to enable accurate monitoring of the grating orientation. In addition, as such a mechanism may be used in combination with soft x-ray radiation, it would be situated inside a vacuum, requiring use of conventional rotary or linear motion feedthroughs which are also commercially available and need not be discussed in detail.

While in the foregoing, preferred embodiments of the present invention have been set forth in detail for the purposes of making a complete disclosure of the invention, it is apparent to those of skill in the art that numerous changes may be made in such detail without departing from the spirit and principles of the invention.

In particular, while designs have been illustrated for the most generally useful case of fixed slits and fixed angles of incidence and diffraction, these values can be changed intermittently or continuously during the wavelength scan, while maintaining the uniqueness of the present invention. For example, a slit may be scanned along the meridional focal surface 64. In addition, the value of the minimum accessible wavelength, $\lambda_o$, diffracted to a fixed position may be changed in the present invention by additionally providing prior art means for scanning the grating or auxiliary optics. For example, translating the slits or the grating may correct for the change in the focal length of varied space ($a_1\neq 0$) embodiments as the grating is rotated according to the present invention.

It is also apparent to any x-ray optical designer that the grating surface may be aspherical. This can be used to self-focus in the y-direction (parallel to the unrotated grooves) without the introduction of an additional mirror reflection, or in combination with other mirrors which provide focusing in this direction. Of course, as such a grating is rotated about its surface normal, the surface radius viewed by meridional rays will change. This may require the use of additional grating motions and/or auxiliary optics to correct for the resulting change in the focal length of the spectral image.

There are also a variety of mechanical mechanisms which could be substituted for the one shown in FIGS. 15 and 16 to provide the means for the simple required rotation. These include commercially available electro-mechanical positioning devices.

The optical systems illustrated in FIGS. 6-12 do not represent an exhaustive listing of all optical configurations for which the present invention can be employed. In addition, the optical systems illustrated can be operated backwards, combined in series, placed in vacuum and ultra-high vacuum chambers to allow transmission of vacuum ultraviolet and x-ray radiation, and comprised of additional mirrors, gratings or other optics to suit the needs of particular experiments. The grating grooves may be profiled in essentially any manner (blazed, laminar, sinusoidal, etc.) and thus manufactured by a number of possible techniques (mechanical ruling, ion etching, chemical etching, holography, electron lithography, optical/UV lithography, x-ray lithography).

In addition, while the present invention has its highest advantage over the prior art of grazing incidence gratings, it can also be used at normal or near-normal incidence. In this case, the spectral resolution will depend upon the numerical aperture of the beam in the y-direction. For many applications, this may require correction by use of a slit which moves in position, or by the introduction of auxiliary optics.

The proposed grating surface rotation about its normal may be used as a method of changing the wavelength detected in any type of instrument employing a diffraction grating, including spectrometers, microscopes and non-dispersive imaging systems. In addition, such change may be discrete rather than the continuous scan typical of monochromator applications. In such case, the rotation mechanism need not provide a continuously adjustable grating rotation, but can be as simple as a manual or other indexable orientation of the grating.

Finally, it should be recognized that while the invention has been applied in detail to vacuum ultraviolet radiation, it may be utilized with electromagnetic radiation of any wavelength, and more generally with wavelike radiation of any nature, including acoustic waves.

What is claimed is:

1. A method for selecting wavelength comprising the steps of:
   a) providing a source of radiation consisting of a plurality of wavelengths;
   b) providing a grating having a surface containing a plurality of diffracting elements, where said surface is reflective to said radiation;
   c) providing means for rotating said grating about an axis which is substantially normal to said surface; where said surface is disposed to receive said radiation and where said means for rotating said grating causes a desired narrow band of said wavelengths to propagate to a restricted region of space.

2. The method of claim 1, in which said diffracting elements are substantially parallel grooves.

3. The method of claim 2, in which said substantially parallel grooves are straight.

4. The method of claim 2, in which said substantially parallel grooves are concentric.

5. The method of claim 2, in which substantially parallel grooves have substantially similar radii of curvature.

6. The method of claim 1, in which said radiation is electromagnetic.

7. The method of claim 6, in which said surface is substantially planar.

8. The method of claim 6, in which said surface is concave.

9. The method of claim 8, in which said surface is spherical.

10. The method of claim 8, in which said surface is aspherical.

11. The method of claim 6, in which said surface is convex.

12. The method of claim 1, in which said means for rotating said grating comprise a bar which is rigidly connected to said grating, said bar and grating rotated about said grating surface normal by a planar surface which is in contact with a spherical member attached to the end of said bar, said planar surface being translated by equal distances as said bar and grating are rotated by equal changes in the cosine of the angle made by said diffracting elements relative to the unrotated orientation of said diffracting elements.

13. An optical system comprising:
   a) a grating comprising a surface containing a plurality of diffracting elements, where said surface is reflective to radiation;
   b) means for rotating said grating about an axis which is substantially normal to said surface;
   c) means for selecting a plurality of wavelengths of said radiation following reflection of said radiation by said surface.

14. The optical system of claim 13, in which said radiation is electromagnetic radiation.

15. The optical system of claim 14, in which said surface is substantially planar.

16. The optical system of claim 14, in which said surface is concave.

17. The optical system of claim 14, in which said surface is convex.

18. The optical system of claim 15, in which said electromagnetic radiation is divergent onto said surface.

19. The optical system of claim 18, in which said diffracting elements are substantially parallel grooves spaced from one another by unequal distances as measured on said surface.

20. The optical system of claim 15, in which said electromagnetic radiation is convergent onto said surface.

21. The optical system of claim 15, in which said electromagnetic radiation is collimated onto said surface.

22. The optical system of claim 16, in which said electromagnetic radiation is divergent onto said surface.

23. The optical system of claim 16, in which said electromagnetic radiation is convergent onto said surface.

24. The optical system of claim 16, in which said electromagnetic radiation is collimated onto said surface.

25. The optical system of claim 22, in which said surface is spherical.

26. The optical system of claim 25, in which said diffracting elements are substantially parallel grooves spaced from each other by equal distances as projected on a plane tangent to said surface, in which the source of said radiation is placed on a circle which is tangent to said plane, said circle having a diameter equal to the radius of curvature of said surface, where said means for selecting a plurality of wavelengths comprise an exit slit placed on said circle, said optical system being a monochromator.

27. The optical system of claim 26, in which said radiation is incident to said tangent plane to said surface at an angle of less than 20 degrees.

28. The optical system of claim 27, in which said source is an entrance slit.

29. The optical system of claim 25, in which said diffracting elements are substantially parallel grooves spaced from each other by unequal distances as projected on a plane tangent to said grating surface.

30. The optical system of claim 29, in which said radiation is incident to said tangent plane to said surface at an angle of less than 20 degrees.

31. The optical system of claim 30, in which said means for selecting a plurality of wavelengths comprise a detection surface placed in the path of said radiation following reflection by said grating, said optical system being a spectrometer.

32. The optical system of claim 31, additionally comprising an entrance slit placed to transmit said radiation, such that said radiation passes along a straight line through said slit and strikes said grating.

33. The optical system of claim 32, in which the distance from said grating to said detection surface is substantially equal to the distance from said grating to said entrance slit.

34. The optical system of claim 19, in which said unequal distances are determined so as to diffract said divergent radiation to a substantial focus at said means for selecting a plurality of wavelengths.

35. The optical system of claim 24, in which said surface is spherical, and in which said diffraction elements are substantially parallel grooves spaced from one another by equal distances as projected on a plane tangent to said surface.

36. The optical system of claim 35, where said means for selecting a plurality of wavelengths comprise an exit slit placed to transmit said radiation following reflection by said grating, said optical system being a monochromator.

37. The optical system of claim 20, where said means for selecting a plurality of wavelengths comprise an exit slit placed to transmit said radiation following reflection by said grating, said optical system being a monochromator.

38. The optical system of claim 37, in which said diffracting elements are substantially parallel grooves.

39. The optical system of claim 38, in which said parallel grooves are spaced from each other by equal distances as measured on said surface.

40. The optical system of claim 38, in which said parallel grooves are spaced from each other by unequal distances as measured on said surface.

41. The optical system of claim 40, in which the distance from the grating to said exit slit is substantially equal to the distance from said grating to the point of convergence of said electromagnetic radiation which is convergent onto said surface.

42. The optical system of claim 21, in which said diffracting elements are substantially parallel grooves spaced from one another by equal distances as projected on a plane tangent to said surface.

43. The optical system of claim 42, in which said means for selecting a plurality of wavelengths comprise 1) a camera mirror placed in the path of said radiation following reflection by said grating, and 2) an exit slit placed to transmit said radiation following reflection by said mirror.

44. The optical system of claim 21, in which said diffracting elements are substantially parallel grooves spaced from one another by unequal distances as projected on a plane tangent to said surface.

45. The optical system of claim 27, in which said exit slit is fixed in position as said grating is rotated by said rotation means.

46. The optical system of claim 28, in which said entrance slit is fixed in position as said grating is rotated by said rotation means.

47. An optical system comprising:
a) a first grating, comprising a surface containing a plurality of diffracting elements, where said surface is reflective to radiation;
b) a second grating, comprising a surface containing a plurality of diffracting elements, where said surface is reflective to radiation;
c) means for co-rotating said first and second gratings about axes which are substantially normal to their respective surfaces.

48. The optical system of claim 47, in which said radiation is electromagnetic radiation, and in which said diffracting elements are substantially parallel grooves.

49. The optical system of claim 48, in which said surface of said second grating is identical in shape and in location of said grooves to said surface of said first grating.

50. The optical system of claim 49, in which said surface of said first grating is a concave sphere.

51. The optical system of claim 50, in which said parallel grooves are equally spaced from one another as projected on plane tangent to said surface.

52. The optical system of claim 49, in which said surface is a plane.

53. The optical system of claim 52, in which said parallel grooves are spaced from one another by unequal distances as measured on said plane.

54. The optical system of claim 51, additionally comprising at least one slit placed to transmit said electromagnetic radiation following reflection by said second grating.

55. The optical system of claim 53, additionally comprising at least one slit placed to transmit said electromagnetic radiation following reflection by said second grating.

56. The optical system of claim 49, in which said electromagnetic radiation is collimated by said first grating.

57. The optical system of claim 49, in which said electromagnetic radiation is focused by said first grating to a point located substantially midway between said first grating and said second grating.

* * * * *